SWEEP AND FUNCTION GENERATOR EMPLOYING DIFFERENCE AMPLIFIER CONTROLLING VARIABLE REACTOR

Filed Sept. 17, 1962

Inventor.
Samuel Olshan.
By. Hofgren, Brady, Wegner
Allen & Stellman.
Attorneys.

3,246,170

SWEEP AND FUNCTION GENERATOR EMPLOYING DIFFERENCE AMPLIFIER CONTROLLING VARIABLE REACTOR

Samuel Olshan, Chicago, Ill., assignor to The Hallicrafters Co., a corporation of Delaware Filed Sept. 17, 1962, Ser. No. 224,074
7 Claims. (Cl. 307—88.5)

Figures 1, 2:
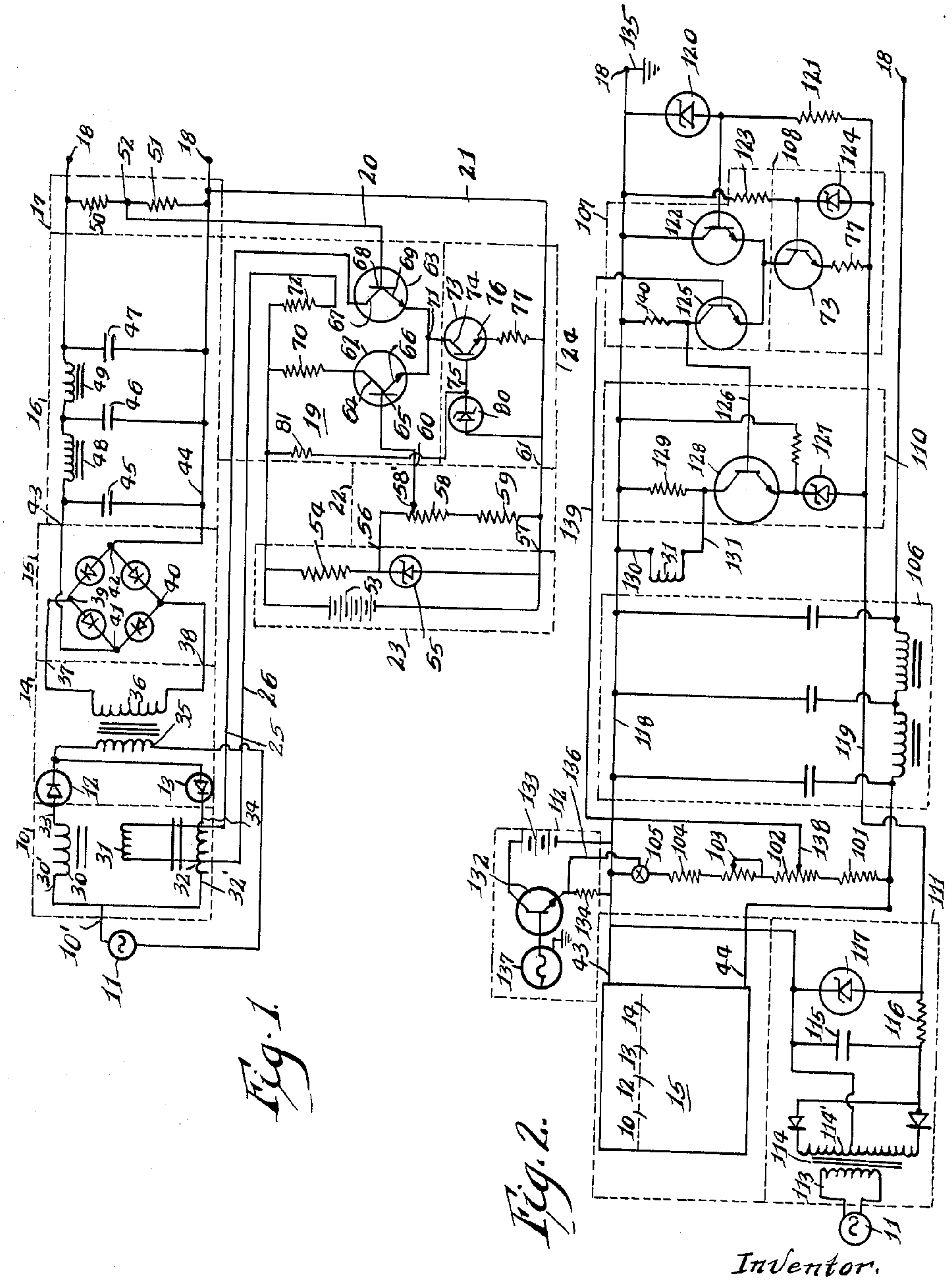

This invention relates to a sweep and function generator and, more specifically, to a circuit for producing an amplified wave form which corresponds to a generated function voltage.

Previous circuits for accompanying this operation were cumbersome, required complicated circuitry and did not have the requisite reliability for modern-day needs.

It is, therefore, an object of this invention to provide a sweep and function generator of extremely reliable characteristics.

It is a further object of this invention to provide a sweep and function generator having a reduced number of components.

It is still a further object of this invention to provide a sweep and function generator with low power losses.

One feature of the invention is the provision in a wave signal generator for developing signals of predetermined wave shape from a source of alternating current signals comprising means, including a device having a variable reactance coupled to the source and having output terminals, for providing variable output alternating current signals, means coupled to the output terminals for developing a direct current potential from the output alternating current signals, means for developing a control voltage of predetermined wave shape, and means responsive to the control voltage and the direct current potential coupled to vary the reactance of the device, for varying the magnitude of the output alternating current signal.

A further feature of this invention is the provision of a saturable reactor coupled to the source of alternating current signals.

Another feature of the invention is the incorporation in such a wave signal generator of a voltage dividing network coupled to the output terminals of the means for developing a direct current potential.

Still a further feature of the invention is the incorporation in the signal generator of a difference amplifier receiving signals from the voltage dividing network and from a function generator.

Yet another feature is the incorporation of a step-up transformer for providing relatively high direct current potentials from a low voltage source of alternating current.

And a further feature of the invention is the incorporation of a power amplifier driven by the difference amplifier and coupled to the control windings of the self-saturating reactor for controlling the magnitude of the variable alternating current signal.

Another feature of the invention is the use of a filtering network which has band pass characteristics for passing variable direct current frequencies as generated by the function generator but blocking alternating current frequency signals at the power source frequency.

Still a further feature of the invention is the incorporation of a switch within the voltage dividing network for selectively actuating the function generator so that the signal generator may be operated as a function signal generator or as a direct current power supply having an adjustable constant output.

Further objects and features will become apparent from the following detailed description taken in connection with the accompanying drawings, in which FIGURE 1 is a circuit diagram of one embodiment of the invention; and FIGURE 2 shows a second embodiment of the invention.

Generally, FIGURE 1 shows a saturable reactor 10 coupled to a source of alternating current voltage 11 and having its output coupled to a pair of diodes 12 and 13. A step-up transformer 14 receiving pulsating signals from the diodes 12 and 13 has its secondary winding coupled across a full wave bridge rectifier 15. The output of the rectifier 15 is coupled through a filtering network 16 to a voltage dividing network 17 and terminates in output terminals 18. A difference or comparison amplifier 19 receives one signal from the voltage divider through leads 20, 21 and receives a second signal from the function generator 22. A regulated power supply 23 provides a reference voltage to the function generator 22. The difference amplifier 19 has incorporated therein a constant current circuit 24.

In operation an alternating current signal is received from source 11 and fed through the saturable reactor 10 and diodes 12 and 13 to the step-up transformer 14. The output of transformer 14 is rectified by the bridge network 15 and filtered by network 16 to provide a direct current voltage across output terminals 18. The function generator 22 develops a voltage wave form of a predetermined wave shape which is coupled to the difference amplifier 19. At the same time a portion of the output voltage is coupled from the voltage divider 17 to the difference amplifier. If there is a difference in signal strength applied to the difference amplifier, it is amplified and coupled through a pair of leads 25, 26 to the control coil on the saturable reactor 10. This, in turn, causes a variation in the strength of signal applied to the primary of transformer 14, causing a variation in the output of the transformer and in the strength of developed direct current voltage across terminals 18. This variation is reflected in the signal applied to the potential dividing network 17, a portion of which is coupled back to the difference amplifier. Thus, the output appearing across terminals 18 follows the wave shape generated by function generator 22.

The detailed structure of the circuit of the embodiment in FIGURE 1 is as follows. A saturable reactor 10 is provided with three windings 30, 31 and 32 and has an input terminal 10′ coupled to each end 30′, 32′ of windings 30, 32 and a pair of output terminals 33, 34. A source of alternating current potential 11 is coupled to input terminal 10′, and a pair of diodes 12, 13 are connected between output terminals 33, 34 and one side of a primary winding 35 of the transformer 14. The other side of winding 35 is connected to source 11. A pulsating direct current signal is developed in the primary winding 35. Secondary winding 36 of transformer 14 has its terminals 37 and 38 coupled to junctions 39 and 40 of full wave bridge rectifier 15. A rectified signal appears across junction 41, 42 of the rectifier 15 and is applied to the input terminals 43, 44 of the filter network 16. Three capacitors 45, 46 and 47 and a pair of inductors 48 and 49 make up filter network 16 which has a design characteristic that serves to filter out any ripple frequency above a predetermined amount, which is related to the source frequency, in this case, over approximately 200 cycles per second, while it has substantially no effect upon the waves of lower frequency. Depending upon the design requirements, this frequency may be anywhere from several cycles per second to several thousand cycles per second. Resistors 50 and 51 having a common junction 52 are series connected across capacitor 47. Output terminals 18, coupled across capacitor 47 in the series resistance network of voltage divider 17, provide means for deriving the output signal to be used in subsequent circuits (not shown).

Reference voltage source 23 includes a battery 53, coupled across a series circuit consisting of resistor 54 and Zener diode 55. The characteristics of this potential source are such as to develop a very constant voltage across output terminals 56 and 57.

Function generator 22 is shown as a pair of resistors 58, 59 connected in series across the Zener diode 55. Resistor 58 has a variable tap 58' which is moved in some predetermined manner to develop a varying potential between junction points 60, 61. The function generator may be a transformer or other voltage source connected to junction 60 in series with the base of transistor 62.

The difference amplifier 19 includes transistors 62 and 63 having respectively collector emitter and base electrodes 64, 67, 66, 69, 65, 68. Collector electrode 64 of transistor 62 is coupled through a load resistance 70 to one terminal of battery 53. The emitters 66, 69 are coupled to a common point 71. Collector electrode 67 of transistor 63 is coupled to lead 25, coil 31, and lead 26 to load resistor 72 and to the positive terminal of battery 53.

The constant current circuit 24 includes a transistor 73 having a collector electrode 74 coupled to common point 71, and a base electrode 75 and emitter electrode 76. The bias circuit for transistor 73 includes a resistor 77 coupled to the negative terminal of battery 53, and a series connected Zener diode 80 and resistor 81, the junction therebetween being connected to base 75.

Although NPN transistors have been shown in the disclosed embodiment, it is to be understood, with proper attention to the polarity of the biasing sources and the direction of connection of the diodes, PNP transistors can be substituted therefor without changing the operation of the circuit.

In considering the operation of the circuit, assume that leads 20, 21, 25 and 26 are broken. A signal applied by source 11 is developed through the coils 30, 32 and diodes 12, 13, at the output terminals 33, 34, across primary winding 35. In this instance, transformer 14 is a step-up transformer, and an alternating current signal of a higher voltage than source 11 appears at the output terminals 37, 38. This signal is rectified by bridge 15, and a direct current potential is developed between junction points 41, 42 and output terminals 43, 44. The direct current potential is filtered by network 16 and appears as a direct current potential across terminals 18.

Now assuming that leads 20, 21, 25 and 26 are connected joining the difference amplifier, the constant current circuit 24, regulated power supply 23 and function generator 22 to the rectifier circuit, the following actions take place.

A constant voltage is developed between output terminals 56, 57 of regulated power supply 23. Potential of a predetermined wave shape is taken from resistor 58 by movable contact 58' and applied to base electrode 65 of transistor 62. The constant current circuit 24 provides a constant amount of current to emitter junction 66 which is thus biased positive with respect to the potential at junction 61. Emitter 69 of transistor 63 is biased at the same potential as the emitter 66 since they are connected to a common junction point 71. Base electrode 68 is biased at a potential positive with respect to the emitter by leads 20, 21. Collector current for transistor 63 flows through leads 25, coil 31, lead 26 and load resistors 72.

Should the variable tap 58' be moved a change in bias across the base emitter junction of transistor 62 occurs and the current flowing therethrough varies. Since only a constant current is available from the constant current network 24 the current flowing through transistor 63 will change in the opposite direction to the current change in transistor 62. If it is assumed that current increases through transistor 62 then it decreases through transistor 63. This decrease in transistor 63 reduces the current flowing through coil 31 of the self-saturating reactor 10 and the potential appearing across terminals 33, 34 is varied. With the assumed conditions this will be an increased potential. An increase at this point results in an increase of direct current potential developed across voltage dividing network 17 and an increase in emitter base bias on transistor 63 is experienced due to the increase in potential developed across resistor 51. Thus, transistor 63 tends to increase its collector current. Consequently, the potential developed between terminals 18 has the same wave shape as the potential developed between terminals 60, 61 of the function generator except in a magnified form due to the feedback characteristics of the difference amplifier and the saturable reactor.

FIGURE 2 shows a second embodiment of the invention and portions of the circuit similar to those in FIGURE 1 are designated by like reference numerals.

The saturable reactor 10, the diodes 12 and 13, transformer 14 and the full wave rectifier 15 are designated by a block having output terminals designated as 43,44. Coupled to terminals 43,44 is a voltage dividing network including series resistors 101, 102, 103, 104 and a switch 105. A filtering network 106 similar to network 16 in FIGURE 1 provides filtering action and is coupled across the voltage dividing network between terminals 43, 44. A difference or comparison amplifier 107 and a constant current circuit 108 are provided as in FIGURE 1 and, in addition, a power amplifier 110 is provided for driving the winding 31 of the saturable reactor 10 as in FIGURE 1. A voltage source 111 has been substituted for the constant voltage source 23 of FIGURE 1. A function generator 112 coupled through switch 105 supplies a function voltage for operation of the generator when desired. In the event that the desired operation is one of a constant voltage output rather than a particular wave form output, function generator 112 may be switched out of the circuit by a switch 105.

Power source 11 is coupled through the primary 113 of a transformer 114 which steps up the voltage and develops an alternating potential across secondary winding 114' of the transformer 114. Capacitor 115, resistor 116 and Zener diode 117 are provided to develop a constant direct current potential for powering and biasing the transistor circuits coupled between a pair of leads 118 and 119. Difference amplifier 107 and constant current circuit 108 coupled between leads 118 and 119 operate in substantially the same manner as the circuits in FIGURE 1 with the addition of a constant biasing network consisting of a Zener diode 120 and resistor 121 coupled in series between leads 118 and 119 and having their common point connected to the base of transistor 122 in the difference amplifier. In addition, a resistor 123 is connected between Zener diode 124 and lead 118. A transistor 125 in the difference amplifier has its collector electrode coupled to a lead 126 to provide a driving signal for power amplifier circuit 110.

Amplifier 110 includes a Zener diode 127 coupled to the emitter of a transistor 128 whose collector is connected through a resistor 129 to the lead 118. The other terminal of diode 127 is coupled to the lead 119. Leads 130 and 131 coupled across resistor 129 provide a current path to the coil 31 of the self-saturating reactor 10 and provide for the control of the output of the generator.

The source of function voltage 112 includes a transistor 132 having its collector electrode coupled to the positive terminal of a battery 133 and its emitter electrode connected through a resistor 134 to lead 118. It is to be noted that lead 118 is grounded through connection 135 and this generator is specifically adapted for developing a positive voltage. A lead 136 coupled to the common point between the emitter electrode of transistor 132 and resistor 134 is connected through switch 105 to the voltage dividing network. A source of function signal 137 is coupled to the base electrode of transistor 132.

In operation, when the circuit 112 is coupled into the circuit through switch 105, the variation in signal applied to the base of transistor 132 causes a variation in the potential developed between a variable tap 138 of resistor 102 and ground. This variation is coupled through a lead 139 to the base of transistor 125 and varies the current through a resistor 140 coupled between the collector of transistor 125 and lead 118. Variation of current through resistor 140 varies the voltage drop across it, and hence, the signal coupled through lead 126 to the base of transistor 128 is varied. The potential drop across resistor 129 changes due to the changing current caused by this varying signal, and the flow of current through lead 131, coil 31 and lead 130 also varies. Since coil 31 controls the saturation of the saturable reactor 10 as previously discussed, the output appearing between terminals 43 and 44 varies accordingly. Thus, voltage output of the device follows the wave form developed in the function circuit 112.

Resistor 129 is provided to supply damping for the generator to prevent unwanted oscillation.

In one successful embodiment of the invention, the following components were used:

| | |
|---|---|
| Transistors: | |
| 73 | 2N 338 |
| 122 | 2N 338 |
| 125 | 2N 338 |
| 128 | 2N 338 |
| Diodes: | |
| 12 | IN 2611 |
| 13 | IN 2611 |
| 124 | IN 3016B |
| Inductors, henries: | |
| 48 | 3 |
| 49 | 3 |
| Capacitors, microfarads: | |
| 45 | .01 |
| 46 | .01 |
| 47 | .01 |
| 115 | 50 |
| Resistors, ohms: | |
| 77 | 2,200 |
| 101 | 634,000 |
| 102 | 5,000 |
| 103 | 500 |
| 104 | 2,200 |
| 121 | 1,500 |
| 123 | 4,200 |
| 129 | 220 |
| 140 | 6.800 |

I claim:

1. A sweep and function generator for developing signals of varying wave shape at a first frequency, from a source of alternating current having a second frequency higher than the first frequency, comprising:

means, including a variable reactor having a control winding, coupled to said source for providing a third alternating current signal of varying magnitude; rectifier means coupled to the variable reactor for developing a direct current potential whose magnitude varies as the magnitude of the alternating current coupled thereo; filter means coupled to said rectifier means, having a pass band characteristic for filtering signals at the second frequency and passing to output terminals signals at the first frequency; means, including a function generator, for developing a varying control voltage; means, including a source of constant current coupled to a difference amplifier having a first input coupled to said filter means and a second input coupled to said function generator, coupled to said control winding for causing said third signal to vary in magnitude in response to variations in said function generator control voltage, said third signal being rectified and filtered in said rectifier and filter means to develop at said output terminals signals of varying wave shape at said first frequency, having a waveform identical to said varying control voltage from said function generator.

2. The sweep and function generator of claim 1 including a step-up transformer between said variable reactor and said rectifier means, having a primary winding coupled to said reactor and a secondary winding coupled to said rectifier means.

3. The sweep and function generator of claim 2 wherein said rectifier means is a full wave rectifier, and said means including a function generator develops a repeating control voltage that varies at a predetermined rate.

4. The sweep and function generator of claim 1 wherein said means, including a source of constant current coupled to a difference amplifier, includes first and second transistors having base, emitter, and collector electrodes, said constant current source being coupled to said emitter electrodes for providing a constant current thereto, means connecting the base electrode of said first transistor to said function generator, means connecting the base electrode of said second transistor to said filter network, means connecting said control winding in series with one of the collector electrodes of said transistors, for varying the third signal in response to variations in said control signals, means connecting the other of the collector electrodes of said transistors to a source of reference potential.

5. The sweep and function generator of claim 4, having means providing a bias voltage, and wherein said means for providing a constant current includes a Zener diode and a third transistor having base, emitter, and collector electrodes, said collector electrode of said third transistor being connected to the emitter electrodes of said first and second transistors, said Zener diode being coupled across the bias voltage, and said base and emitter electrodes of said third transistor being coupled across said Zener diode.

6. The sweep and function generator of claim 5 wherein said means including a filter network includes a voltage dividing network, said base electrode of said second transistor being coupled to said voltage dividing network, and a switch, connected in said voltage dividing network, for selectively actuating said sweep and function generator by said function generator.

7. The sweep and function generator of claim 5 wherein said means connecting said control winding in series with one of the collector electrodes includes a second Zener diode and a power amplifier having second base, second collector, and second emitter electrodes, said control winding being coupled to said second collector electrode, said one of the collector electrodes being coupled to said second base electrode, and said second Zener diode being coupled to said second emitter electrode.

References Cited by the Examiner

UNITED STATES PATENTS

| | | | |
|---|---|---|---|
| 2,830,250 | 4/1958 | Fredrick et al. | 321—25 |
| 3,080,517 | 3/1963 | Borkovitz | 323—66 |
| 3,087,107 | 4/1963 | Hunter et al. | 321—25 |
| 3,114,873 | 12/1963 | Love | 321—25 |
| 3,122,694 | 2/1964 | Muchnick et al. | 321—25 |

ARTHUR GAUSS, *Primary Examiner.*